United States Patent
Stienhans

(10) Patent No.: US 7,974,944 B2
(45) Date of Patent: Jul. 5, 2011

(54) HUMAN DATA MANAGEMENT

(75) Inventor: Frank Stienhans, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/857,418

(22) Filed: Aug. 16, 2010

(65) Prior Publication Data
US 2010/0306666 A1 Dec. 2, 2010

Related U.S. Application Data

(63) Continuation of application No. 11/444,450, filed on Jun. 1, 2006, now abandoned.

(51) Int. Cl.
G06F 17/30 (2006.01)
(52) U.S. Cl. ........................................ 707/610; 707/687
(58) Field of Classification Search ........................ None
See application file for complete search history.

(56) References Cited

U.S. PATENT DOCUMENTS

| 6,654,768 | B2 | 11/2003 | Celik |
| 2002/0049751 | A1 | 4/2002 | Chen et al. |
| 2002/0052921 | A1 | 5/2002 | Morkel |
| 2002/0184055 | A1 | 12/2002 | Naghavi et al. |
| 2004/0078388 | A1 | 4/2004 | Melman |
| 2004/0267887 | A1 | 12/2004 | Berger et al. |
| 2005/0091272 | A1 | 4/2005 | Smith et al. |
| 2005/0114527 | A1 | 5/2005 | Hankey et al. |
| 2006/0005263 | A1 | 1/2006 | Hardt |

Primary Examiner — Mohammad Ali
Assistant Examiner — Syed H Hasan
(74) Attorney, Agent, or Firm — Mintz, Levin, Cohn, Ferris, Glovsky and Popeo, P.C.

(57) ABSTRACT

The present invention discloses methods and systems for managing data in user-centric environment. In this environment an entity is authorized to receive user data based on the relationship between the entity and a user. A user provides message data for communication to a selected entity by one or more communication channels. Based on privileges assigned to the entity, user data may be retrieved, including a contact method for the entity. In addition a communication template is retrieved based on the communication channel. By populating the template with the first data and the user data; a communication is created and transmitted to the selected entity using the communication method.

17 Claims, 9 Drawing Sheets

HUMAN DATA MANAGEMENT

CROSS REFERENCE TO RELATED APPLICATIONS

This application is a Continuation of patent application Ser. No. 11/444,450, filed on Jun. 1, 2006 now abandoned, entitled "HUMAN DATA MANAGEMENT", the contents of which are hereby fully incorporated by reference.

TECHNICAL FIELD

Systems and methods consistent with the present invention relate to data management. More particularly, the invention relates to systems and methods for managing an individual's data in a web-based environment.

BACKGROUND OF THE INVENTION

In today's world, an individual may maintain dozens of relationships with various private, personal, and public entities, such as family, friends, organizations, government agencies, retailers, service providers and/or publishers. These relationships may require the individual to exchange information with the entities in one form or another, and maintain the information for future use. However, as the number of relationships increases, so does the burden on the individual to manage the information associated with these relationships. For instance, each relationship may be associated with names, dates, addresses, telephone numbers, account numbers, contracts or other such information. Furthermore, some relationships may involve more than one entity; such as when an individual arranges to automatically pay a creditor from a bank account. Consequently, managing the information necessary to maintain these relationships can be quite cumbersome for the individual. In fact, some individuals may spend many hours each month simply responding to and organizing correspondence received from different entities.

In addition, when an individual maintains a large number of relationships, even simple tasks can become time-consuming chores for the individual. For instance, when updating a mailing address, the individual may need to provide the new address to every entity with whom the individual has a relationship. To make matters worse, different entities may require different contact methods to communicate the changes (e.g., webpage, e-mail, fax or hand-carried mail). As a result, the individual may go through great trouble to notify each of the entities of the address change in the required manner.

In view of the foregoing, there is a need for systems and methods for providing software that overcomes one or more of the above-noted problems and/or disadvantages by improving an individual's ability to manage various relationships and data in an efficient manner.

SUMMARY

Embodiments consistent with the present invention provide methods and systems for managing software content. Further, in accordance with aspects of the invention, the software may correspond to any type of application, software package, or framework.

In one embodiment methods and systems are provided for managing data in a user-centric environment. In this environment an entity is authorized to receive user data based on the relationship between the entity and a user. A user provides message data for communication to a selected entity by one or more communication channels. Based on privileges assigned to the entity, user data may be retrieved, including a contact method for the entity. In addition a communication template is retrieved based on the communication channel. By populating the template with the first data and the user data; a communication is created and transmitted to the selected entity using the communication method.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with aspects of the present invention and together with the description, serve to explain the principles of the invention. In the drawings.

DETAILED DESCRIPTION

The following detailed description of embodiments of the present invention refers to the accompanying drawings. Where appropriate, the same reference numbers in different drawings refer to the same or similar elements.

The present invention enables an individual to manage data in a user-centric environment. User-centric environments are based on the concept of an individual's digital identity. Generally, a digital identity refers to the relationship existing between the data that identifies an individual and the entities that interact with the individual based on that data. The user-centric environment is organized such that the individual's digital identity is placed at the so-called "center" of an environment and entities are authorized by the user to receive user data based on the relationship between the entity and the user.

Within this environment, the user is enabled to interact with various entities through software, such as web-based software services.

Figure 1:
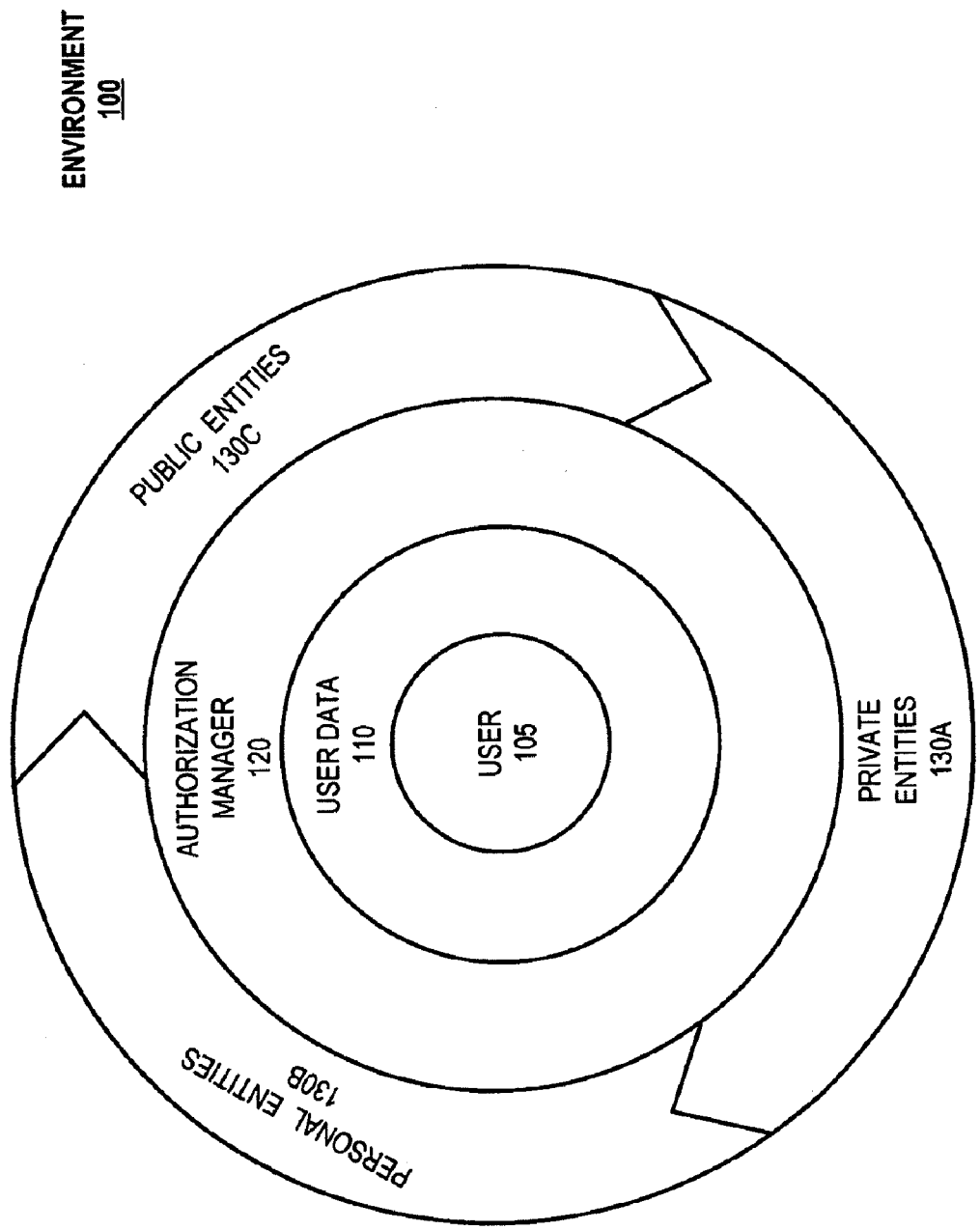
FIG. 1 provides diagram illustrating a conceptual overview consistent with aspects of the present invention.

FIG. 1 shows a conceptual illustration of a user-centric service environment 100, consistent with embodiments of the present invention. Environment 100 may include several layers including user 105, user data 110, authorization manager 120 and entities 130A-130C. The user 105 may be an individual person that acquires (i.e., purchases, leases, licenses) rights to access a user-centric data management service from a software provider. Generally, a user 105 is an individual human being, however in other cases, a user 105 may be a group of people including, for example, a family, a business, or some other group of people acting in single organizational unit.

As shown in FIG. 1, user data 110 is kept separate from the entities 130 by authorization manager 120. The user data 110 may be any information that describes user 105 and/or the relationship between the user 105 and entities 130. User data 110 may be, for example, names identification numbers, login names, addresses, phone numbers, e-mail address, web addresses, contracts, account numbers, payment information, and the like.

The authorization manager 120 determines whether the user data 110 may be shared with each entity 130 based on the entity's respective relationship with the user 105. As such, authorization manager 120 may authenticate entities 130 to verify an entity's identity using various methods known in the art, including passwords, key codes, and encryption keys. For instance, a public entity 130A that requests access to the user data 110 assign privileges to view user data 110 within the environment 100. The privileges may be assigned by default, based on the class of an entity 130, or assigned individually by user 105. For instance, different entities 130 may have privileges to read, write and/or erase user data 110. Before enabling the access to the information for provision to an entity 130, the authorization manager 120 may prevent access based on the privileges allotted to the entity 130A by default based on the user-entity relationship or otherwise assigned by the user 105. Thus, the privacy of user 105 is automatically protected while the exchange of information necessary to support the user's 105 relationship with each entity 130 is enabled.

As shown in FIG. 1, entities 130 may be classified into several classes. Private entities 130A may include a class of people with whom the user 105 maintains a private relationship, for example, family and friends. A personal entity 130B may be a class of entities with which a user 105 maintains a direct personal, but non-private relationship, such as a employer, landlord, tenant, club, church, sports team, or other organization. In other cases, an entity 130C may represent a class of public entities such as a retailer, service provider, utility provider, health care provider, financial institution, creditor, insurer, or government organization, or publisher, which relate to the user 105 as a member of the general public. Of course, other classes, divisions, subdivisions, and/or types of entities may be included in the classes of entities 130.

In accordance with the present invention, different classifications may be granted different levels of authorization to provide and/or receive the users 105 information. For instance, the authorization manager 120 may, by default, allow friends and family members in entity class 130A to view user's 105 online photo album, but deny such access to personal entities 1308, such as the user's employer, unless otherwise specified by the user 105.

Although FIG. 1 only shows environment 100 with regard to a single user 105, embodiments consistent with the present invention may involve a large number of users 105, each having an associated environment 110 and interacting with different of entities 130. Exemplary components of a user-centric service environment 100 consistent with exemplary embodiments of the present invention are described in greater detail below.

Figure 2A:
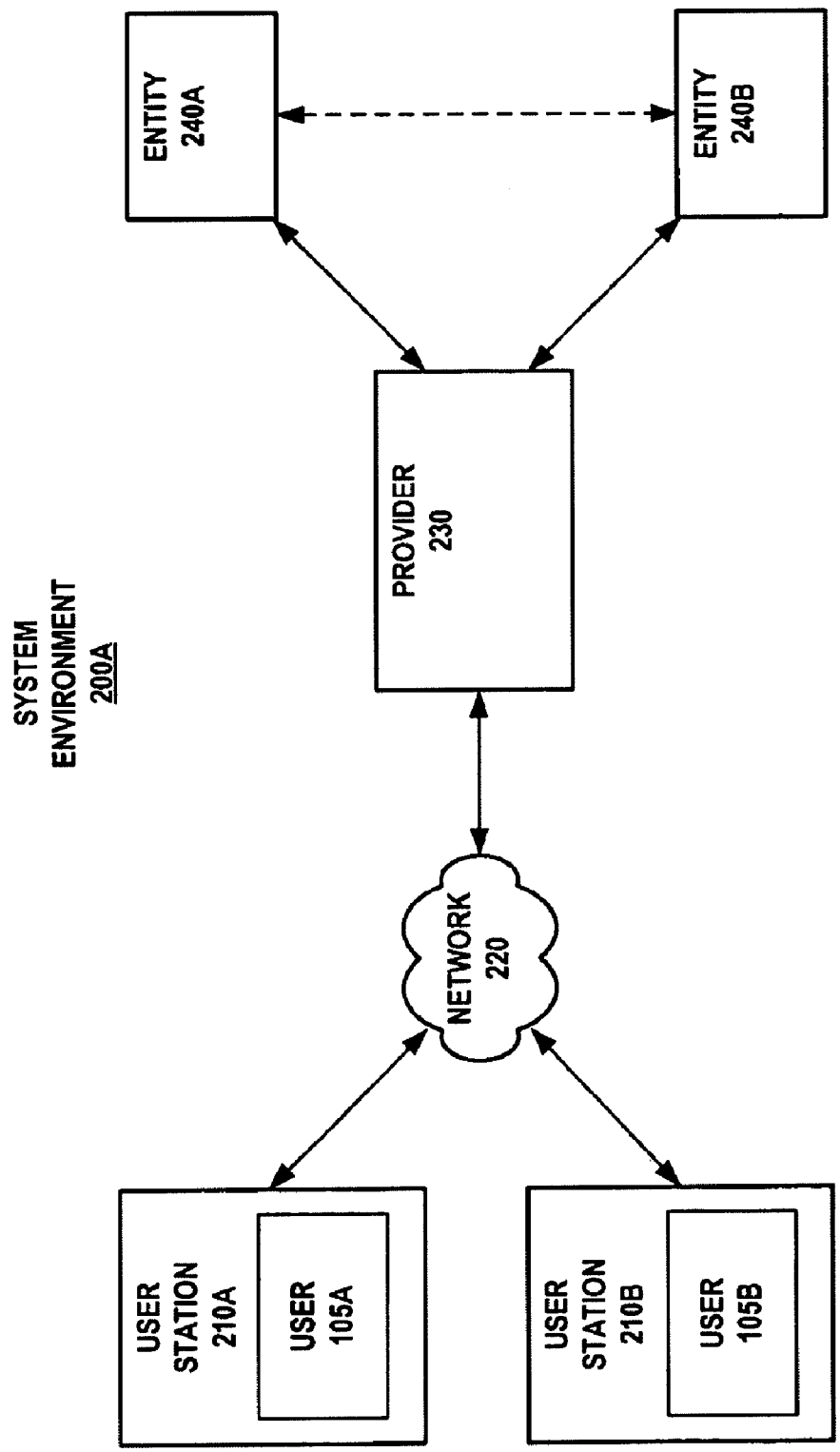
FIGS. 2A and 2B provide block diagrams illustrating exemplary system environments, consistent with an embodiment of the present invention.

FIG. 2A illustrates an exemplary system environment consistent 200A with an embodiment of the present invention. Environment 200A may include user stations 210A and 210B, network 220, provider 230, and entity stations 240A and 240B.

Users 105A and 105B may use a respective one of user stations 210A or 210B for accessing user-centric data management services at provider 230 over network 220. User stations 210, for example, may be one or more data processing systems, such as a computer, that perform computer executed processes for providing user 134 an interface to network 140 for accessing data and applications hosted by provider 110.

Network 220 may be one or more communication networks that communicate applications and/or data between user stations 210, provider 230, and entities stations 240. Network may be any shared, public, private, or peer-to-peer network, encompassing any wide or local area network, such as an extranet, an Intranet, the Internet, a Local Area Network (LAN), a Wide Area Network (WAN), a public switched telephone network (PSTN), an Integrated Services Digital Network (ISDN), radio links, a cable television network, a satellite television network, a terrestrial wireless network, or any other form of wired or wireless communication networks. The particular composition and protocol of network 220 is not critical as long as it allows for communication between user stations 210, provider 230 and/or entity stations 240.

Provider 230 may be a provider of user-centric data management services for users 105 over network 220. As described in more detail below, provider 110 may administer and maintain the user-centric application software, as well as the servers and data storage devices on which the application resides. Environment 200 may also allow provider 230 to perform administrative tasks such as lifecycle management, upgrading system components, updating or replacing software, and archiving or recovering user's 105 data.

Provider 230 and user stations 210 may have a client-server relationship and, accordingly, provider 230 may include at least one server including application software for hosting user stations 210. In accordance with embodiments of the present invention, provider 230 may provide user-centric data management service software to user 105 as part of a standalone service or within an integrated suite of services. For instance, provider may be an may be an Internet services provider (also referred to as a content provider), such as YAHOO!, which may provide the user-centric data management service as one of many web-based services offered to its customer through an Internet web portal.

Entity stations 240A and 240B represent facilities of entities 130 that user 105 and provider 230 might interact with via the user-centric data management service. Entity station 240 might simply represent location of the entity's 130 home or mailing address. Likewise, if an entity 130 is a business, organization or the like, the entity station might represent a location of the entity's 130 operations.

Some entities 130 may communicate with a provider using traditional communication channels such as hand-carried mail sent and received from entity station 240. Other entities 130 may exchange information electronically using computer terminals or servers that communicate over a network, such as those describe for network 220. For example, entity 130 may be a vendor that sends invoices and receives payment electronically over network 220. In this case, similar to the user stations 210 described above, an entity station 240 may include a computer that executes applications consistent with carrying out the present invention, including network communications and user interface software. Network communications software may encode data in accordance with one or more of the aforementioned network communication protocols to enable communication between entity stations 210 and provider 230 over network 220.

Furthermore, in accordance with embodiments of the present invention, entity stations 240 may be members of the user-centric service environment that agree to use predefined formats for communicating information between user stations 210, providers 220, and entity stations 240. For instance, provider 230 and entities 240 may exchange information using communications created from common templates and semantics (e.g., an XML schema). As a result, user stations 210, providers 220 and entity stations 240 may accurately recognize and translate information contained in communications exchanged between provider 230 and entities stations 240.

The arrows between provider 230 and entity stations 240 in FIG. 2 represent channels of communication. The communication channels may any means known in the art for exchanging information including, for example: network transfer, electronic mail, SMS (short messenger service), MMS (multimedia messenger service), hand-carried mail, facsimile, telegram, broadcast, wireless, telephone, and the like.

In accordance with an embodiment of the present invention, a user 105A may access a user-centric data management service hosted at provider 230 over network 220 using station 210A. By way of the user-centric data management service, the user 105A may, for example, initiate a process for updating the mailing address used by entities stations 240A and/or 240B to communicate with user 105. The provider 230 may receive the new address information from user 105 and distribute the information to any and all of entities 240A or 240B authorized by user 105 to receive the information based on predefined communication methods assigned for each entity 240.

Conversely, an entity 240A may provide information to user station 210A through provider 230. For instance, provider 230 may receive an address change communication from entity 240A. If, for example, entity 240A is a trusted entity, provider 230 may simply update the entity's 240 contract information in user data 210 without input from user 105. In other cases, provider 231 may present the communication to user 105 for approval before updating the entity's address information. In still another case, where the entity 130 is unrecognized, the provider 230 may treat the communication as an unsolicited (e.g., "spam" or "junk mail"), and flag the information for deletion, unless otherwise acted upon by a user 105.

Figure 2B:
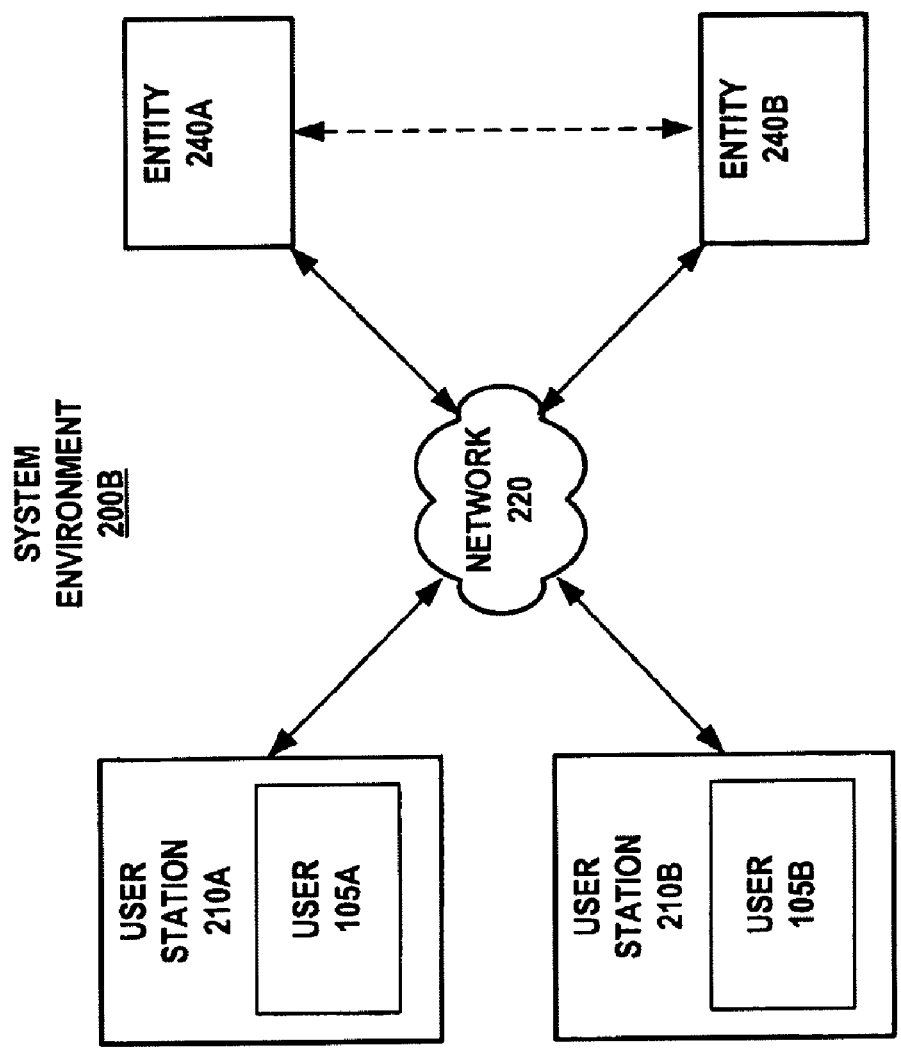

FIG. 2B illustrates an exemplary system environment consistent with an another embodiment of the present invention. Similar to environment 200A, environment 200B includes user stations 210, network 220 and stations 240. However, as shown in FIG. 2B, environment 200B lacks provider 230. In accordance with this embodiment, user stations 210 may incorporate the functionality of provider 230 and may maintain the human-centric data management service and associated data at each of users' 105 respective stations 210. That is, instead of a client-server arrangement, user stations 210 may exchange information directly with entity stations 240. Otherwise, environment 200A and 200B may operated in substantially the same manner.

While FIGS. 2A and 2B, for purposes of illustration, shows only a limited number of user stations 210, networks 220, providers 230 and/or entity stations 240, system environments 200A and 200B may include any number of these components.

Figure 3:
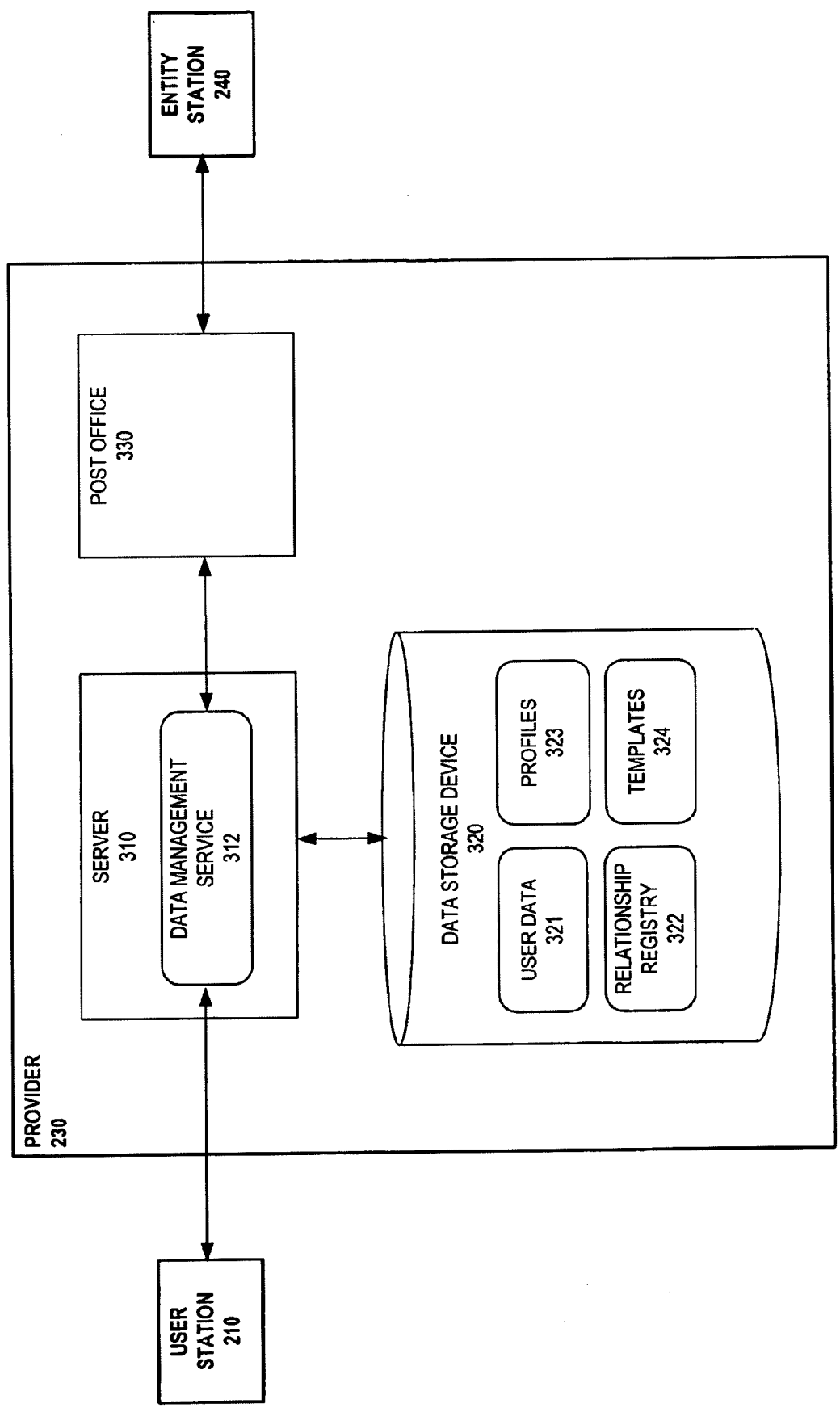
FIG. 3 provides a block diagram illustrating a provider, consistent with an embodiment of the present invention.

FIG. 3 illustrates exemplary components, consistent with embodiments of the present invention including a user station 210, provider 230 and an entity station 240. User station 210 may be one or more data processing systems that perform computer executed processes for providing user 105 an interface to network 220 for accessing data and applications hosted by provider 230. User station 210 may be implemented as one or more computer systems including, for example, a computer, a personal computer, minicomputer, microprocessor, workstation, or similar computer platform typically employed in the art. User station 210 may be comprised of components, including a processor, a random access memory (RAM), a program memory (for example, read-only memory (ROM), a flash ROM), a hard drive controller, a video controller, and an input/output (I/O) controller coupled by a processor (CPU) bus. In exemplary embodiments, user station 210 may include a display and one or more user input devices that are coupled to user station 210 via, for example, an I/O bus.

User stations 210 may execute applications consistent with carrying out present invention, including network communications and user interface software. Network communications software may encode data in accordance with one or more of the standard network communication protocols to enable communication between user stations 210 and provider server 310 over network 220. A user interface application may allow user 105 to display and manipulate data and applications hosted by provider 230, for example in the case of environment 200A, or provided by user-centric application, in the case of environment 200B. The user interface can be, for example, a web-based interface having a web browser or can be a non-web interface capable of displaying trace data stored in extensible Markup Language (XML) format or other standard format for data.

Provider 230 may include server 310 for communicating with user station 210 over network 220. Server 310 may be one or more processing devices that execute software modules stored in one or more computer memory devices. Server 310 may include components typically included in a server system, such as a data processor (not shown), network interface (not shown) and data storage device 320. For example, server 310 may include a computer, a personal computer, a minicomputer, a microprocessor, a workstation or similar computer platform typically employed in the art. Furthermore, as describe below, server 310 may execute a plurality of applications including software for managing network communications, providing a user interface, managing databases (e.g. database management system), and providing applications over network 220 (e.g. application server).

As shown in FIG. 3, server 310 may execute user-centric data management service 312 for providing a user-centric data management service for user station 210 and entity station 240. In particular, user-centric data management service 312 may be a integrated set of computer programs for managing user data 110, consistent with the present invention.

Data storage device 320 may be associated with server 310 for storing software and data consistent with the present invention. The storage device 330 may be implemented with a variety of components or subsystems including, for example, a magnetic disk drive, an optical disk drive, flash memory, or other devices capable of storing information. Further, although data storage device 320 is shown as part of provider server 310, it may instead be located externally to the provider 230. For instance, data storage device 320 may be located within each user station 210, or it may be configured as network attached storage (NAS) devices accessible remotely by provider 230 over network 220. As will be described in more detail below, data structures stored in data storage device 230 may include user data 321, relationship registry 322, profiles 323, archives 324 and/or templates 325

Provider 230 may further include a post-office 330 for sending and receiving communications to and from entity stations 240. Post office 330 may process communications in both electronic and paper form. Electronic communications may include, for example, e-mails, SMS, MMS, text messages, instant messages, broadcast messages, telephone messages, and the like. Paper communications may include letters, documents, hand-carried mail and facsimiles, for instance. In the case of paper communications, post office 320 may receive the communication and transform it into electronic format through, for example, digital scanning. Once scanned, the communication may be provided to the user-centric data management service 312 for further processing and translation, in the same manner as communications originally received in an electronic format.

Turning now to the data stored in data storage device 320, data storage device 320 may store user data 321, relationship registry 322, profiles 323, and templates 324. User data 321 may by any type or format of data. Consistent with embodiments of the present invention, user data 321 may be classified and organized by the data management service 312 according to a user's 105 relationship with the entities 130 corresponding to the data. User data 321 may include, for example, contact data, payment data, account data, communication data, contacts data, calendar data, and public data. This user data 321 may be referenced based on requests from processes executed by data management service 312. For instance, a bill payment process may request the contact data of a utility provider from a contact service module for performing an automated payment.

Contact data may include information similar to that of an address book including names, mailing addresses, phone numbers, e-mail addresses, and web addresses of entities 130. Furthermore, contact list may maintain distribution lists for different classes of entities 130 (e.g., family, friends, and coworkers). Account data may include information about the various accounts user 105 maintains with entities 130. For instance, an account may be based on the terms of a contract stored in contract data. Payment data may store all details with regard to money transfers. Of course, there are different ways for transfers to be executed such as payments using electronic payments (e.g., PAYPAL), credit cards, bank account debits, or checks. Payment data may be accessed, for example, bill payment service to determine the manner in which an entity accepts payment. Contract data may be information regarding contracts the user has entered. For example, leases, loans, employment, insurance policies, purchase agreements. Contract data may store terms of an installment contract including, creditor name, contract payoff amount, payoff deadline, interest rate, periodic payment, and the like. Calendar information may include typical calendar information about the dates of meetings, events, deadlines, due dates, holidays, and vacations. For example, a vacation scheduling agent may attempt to create proposed vacation times with by retrieving packages from travel agencies and comparing the proposed dates to the user's calendar. Public information may be a set the user's 105 that the user opts to make available to everyone. It may include, for instance, the content of a user's 105 personal web page or online photo album. Archive data may be information received by data management service 312 from users 105 and entities 130 that are stored for future reference and backup.

As further shown in FIG. 3, data storage device 320 may also store a relationship registry 322. Relationship registry 322 may list each entity that user 105 has established a relationship and associate the entity 240 together with metadata describing the entity 130 and/or links to a entity profile 323 including user data 321 associated with that entity 130. For example, relationship registry 322 may associate an entity 130 with a unique identifier, name, class, and profile. Entity name may be, of course, the proper name of the entity 130. Class may be the class of entity 130 (e.g., private, personal or public) based on the entity's relationship to the user. The registry 322 may include other classes and/or subclasses of entities. For example, the class "public" may include the subclass "financial," which in turn may include the subclasses "bank," "credit," and "PAYPAL".

Furthermore, registry 332 may associate an entity stations 240 with one of profiles 323. In particular, each of entities 240 may be associated with one or more of profiles 323 containing detailed information describing, at least, entity's 130 user data 321 and privileges. Each profile 323 may organize information corresponding to the above-noted classes of user data 321. Profiles may be based a standard templates for each type of relationship (personal, retail, financial, public). When user data is received, it may be stored in a corresponding field within an entity's profile 323. In addition, a profile 323 may contain access privileges, including read, read/write, read-only, confirmation required, or no confirmation required.

Communication templates 324 may be predefined forms for sending and receiving a communication between provider 230 and entity stations 240. Each type of communication performed by either the provider 230 or entities 130 may have one or more templates including fields corresponding to that particular type. For example, forms may be an XML template for an e-mail from a user 105 to an entity 130, wherein the template includes predefined fields for receiving user's name, entity's email address and message text.

Figure 4:
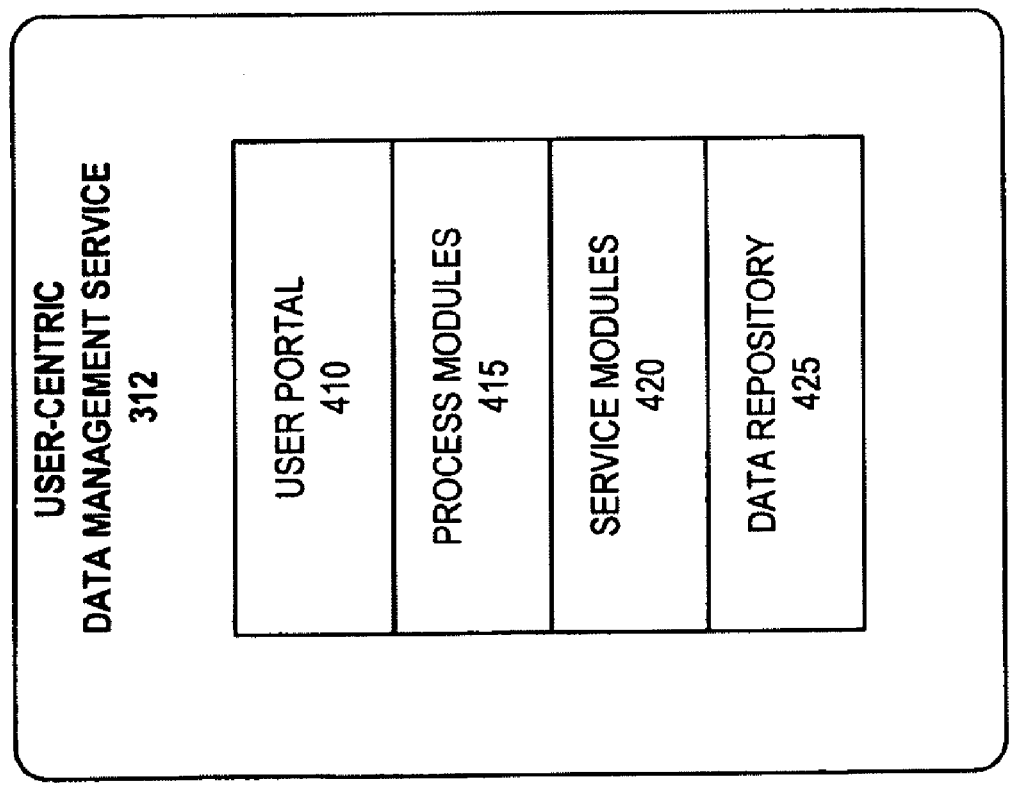
FIG. 4 illustrates a block diagram of exemplary data management service, consistent with an embodiment of the present invention.

FIG. 4 illustrates exemplary components of the user-centric data management service 312, consistent with the present invention. The user-centric data management service 312 may be a composite software application having several integrated units. These units may represent, for instance, a user portal 410, user-centric process modules 415, service modules 420, and a data repository 425.

User portal 410 may provide an interface allowing a user 105 at user station 210 to interact with and control the user-centric data management service 312. The user portal 410 may provide several functions including a user interface, a data manager, and a document manager.

The user portal 410 may provide human-computer interface over network 220 enabling a user 105 to interact with the data management service 312 through a user station 210. For instance, similar to an user interface for an e-mail system, user-centric data management service 312 may provide a primary user interface for selecting and viewing communications received from entities 130. In addition, user interface may enable the user 105 to launch data management application 312 processes which, themselves may provide role-based user-interfaces for viewing and controlling processes performed by the data management service 312. User interface may, for example by implemented as graphical user interface including conventional screen elements, such as menus, lists, tables, icons, action buttons, and selection or text entry fields, for these purposes. The user interface may be customized to particular groups of users 105 and/or personalized to display information or applications a particular user 105 prefers. In addition, the user interface may provide user 105 with access to other services such as, for example, e-mail, voice over Internet, fax, and/or instant messaging applications.

User portal 410 may further enable user 105 to manage user data 321 and profiles 323. For instance, through a data manger, user may input user data 321, viewing profiles 323, manage user data 321 create new entity profiles 323, and/or assign data access privileges to entities 130.

User portal 410 may also provide a document manager enabling a user 105 to search communications archived in data storage device 320 based on classification or keywords. Further document manger may allow a user 105 to index, classify, navigate, search and publish communications and other information stored data storage device 320.

Turning now to process modules 415 and service modules 420 provided in data management service 312, process modules 415 and services modules 420 may be computer-readable instructions and data executed by server 310 for performing specific data management tasks, such as a address change communication or bill payment. Process modules 415 generally do not access user data 321 directly, but instead may rely on service modules 420 to retrieve and process user data 321 to provide a result required by the process module 415. For instance, a bill pay application may be initiated by the user 105. In accomplishing this task, the bill payment process may rely upon services such as a data service module for retrieving data, a contact service module for retrieving contact data for the associated vendor, a web service module for communicating with a entity over the network, and a communication service module for scanning and/or archiving an invoice and payment order. After receiving data from each of the various service modules 420, process module may process the data and present a result to the user 105 using user portal 410.

Data repository 425 may be computer-executable instructions and data for performing several functions including software processes for storing, retrieving, organizing, and archiving user's 105 data. For instance, when a new communication is received by user-centric data management service 312 from post office 330, data repository 425 may store a copy of the communication for backup and archival purposes in user's 105 archive data. In addition, the data repository 425 may interact with the authorization manager 120 to authorize storage and retrieval in response to request from service modules 420.

Moreover, data repository 425 may include software for extracting non-standard communications received by data management service 312. For instance data repository 425 may perform optical recognition on a paper communication and convert their contents to computer-readable text, which may then be classified based on of user data 321 type, and stored in association with the entity's 130 corresponding profile 323.

Figure 5:
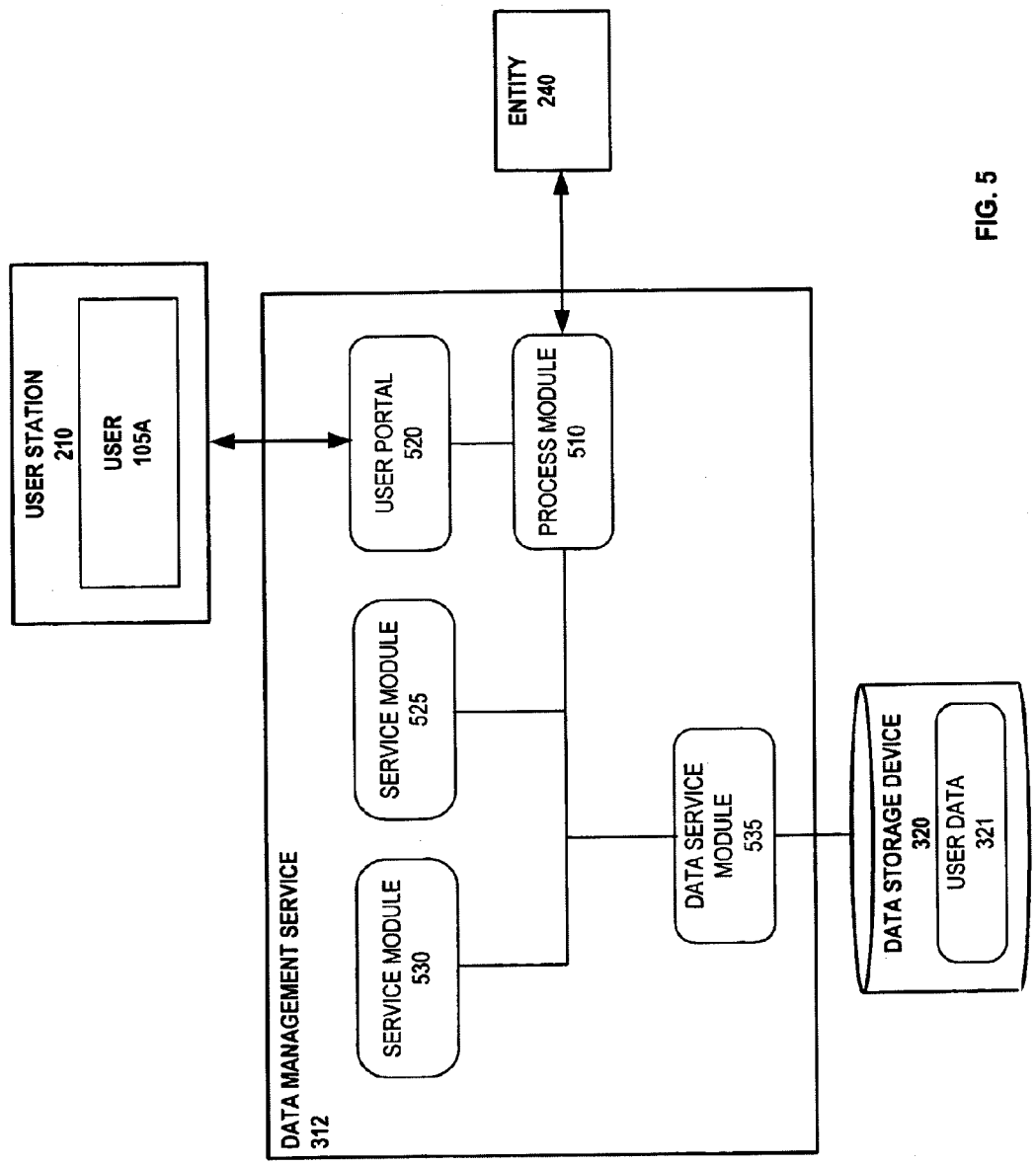
FIG. 5 provides a block diagram illustrating exemplary relationships between software, consistent with an embodiment of the present invention.

FIG. 5 is a diagram illustrating a exemplary software configuration for data management service 312, including process module 510, user portal 520 and service modules 525, 530 and 535. A user 105 at user station 210 may access the data management service 312 at provider 230. Through user portal 520, user 510 may select process module 510 from one of several functions offered by the data management service 312. As shown, process module 510 is associated with service modules 525-535, which may be triggered in the execution of process module 510. Process module 510 and services modules 525-535 may follow a "plug in" paradigm. That is, various service modules 525-535 available within the data management service 312 may be included in process module 510 as necessary to achieve a particular process functionality. In addition, although not shown, each module 510, 525, 530 or 535 may communicate with another through an software interface (e.g., an API) enabling the modules to exchange data without having knowledge of the internal functions of another module.

When a user 105 executes a process module 510 using a user portal 520, the process 510 may, for example, call service module 525 which produces a result that is then passed to service module 530, which in turn may provide a secondary result to process module 510. Each of service modules 525 and 530 may further reference data service module 535 which, through data repository 425, provides access to user data 321 in data storage device 320. Based on the results provided by the service modules 425-435, the process module 510 may provide the final result to the user station 210 presented on user interface 520.

For example, a process module 510 for optimizing a user's 105 insurance contracts might access a user's 105 contact data in user data 321 by triggering service module 525 that extracts information with regard to insurance contracts from user data 321 in an entity profile 323. Then, based on this result, second service module 530 may receive the information and act as an online agent to query, over the Internet, other insurance provider for more affordable insurance contract proposals. The results of the query may be returned to the insurance optimization process 510, which may compare the proposals and present a recommendation to the user 105 via user portal 520.

Figure 6:
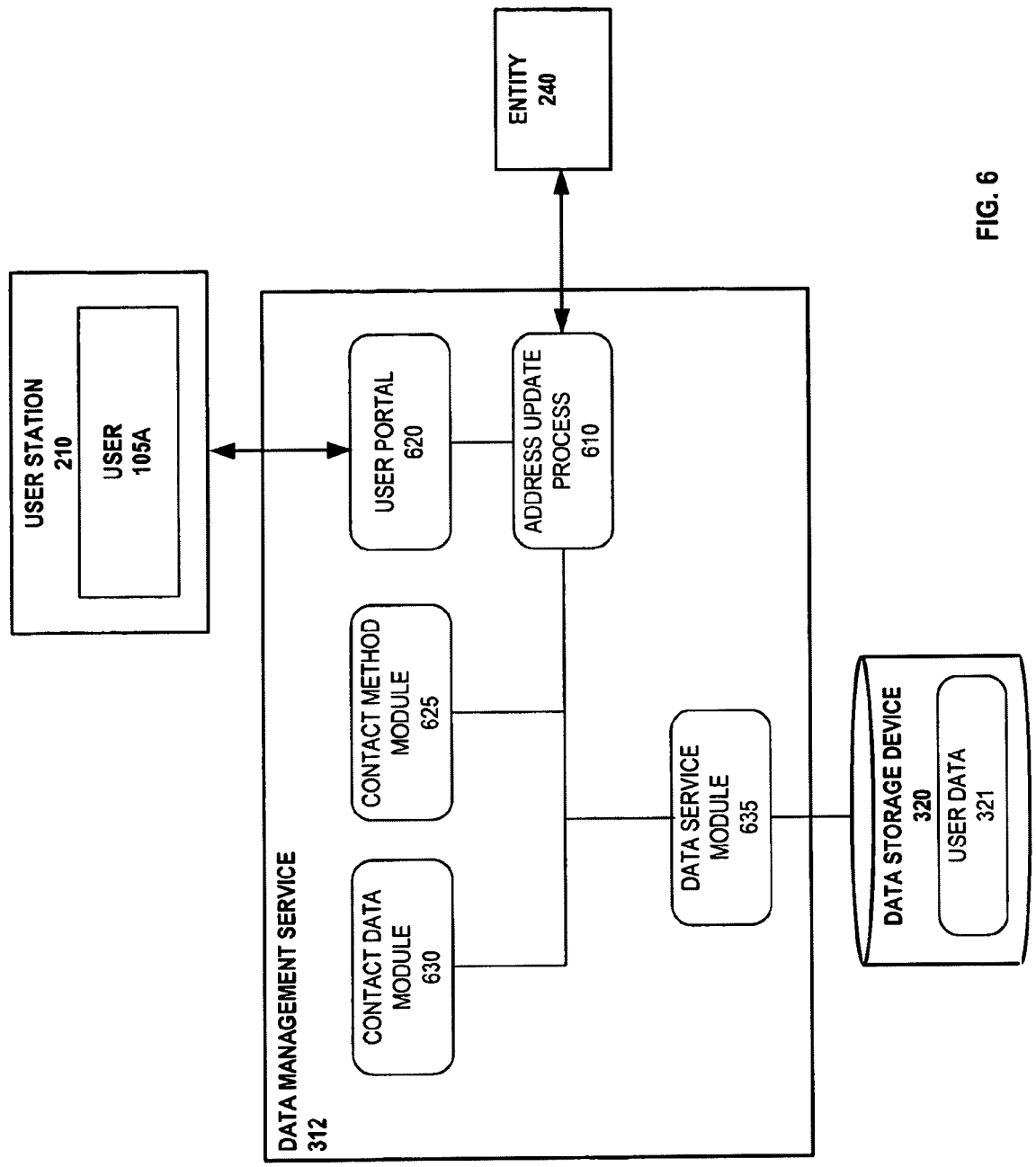
FIG. 6 provides a diagram illustrating exemplary relationships between software, consistent with an embodiment of the present invention.

FIG. 6 is a diagram illustrating a software configuration for an exemplary process for notifying entities 130 of a user's 105 change of address. As shown, data management service 312, including process module 610, user portal 620 and service modules 625, 630 and 635. A user 105 at user station 210 may access the data management service at provider 230 in order to inform entities 130 of a new mailing address. Through user portal 620, user 105 may select an address update process module 610 from one of several functions offered by the data management service 312. As shown, address update process module 610 is associated with contact method service module 625, contact data service module 630 and data service module 635. Process 610 may, for example, first call module 625 which retrieves a contact method identifying the preferred method of communication for a selected entity 130 from profile 323. This result that may then be passed to service module 630 which, based on the contact method, retrieves corresponding contact information. For example, if the contract method provided by service module 625 is "e-mail," then service module 630 may retrieved entity's 130 e-mail address. Based on the contact method and contact data provided by the service modules 625 and 630, the process module 610 may generate an e-mail communication for entity 130 and, by way of user portal 620, present the e-mail to user 105 for review and approval.

Figure 7:
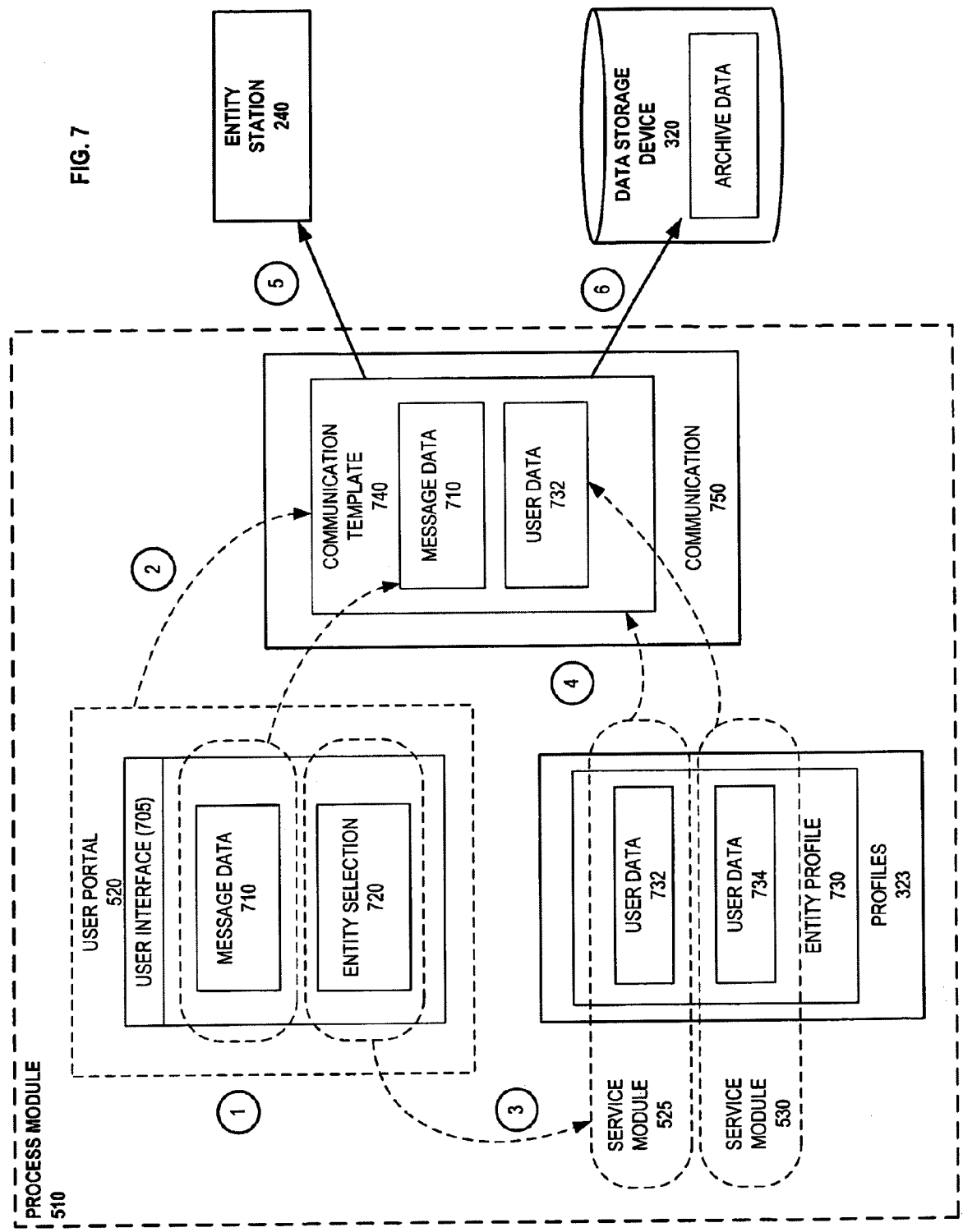
FIG. 7 provides a diagram illustrating exemplary data structures, consistent with an embodiment of the present invention.

FIG. 7 illustrates a functional block diagram of a process for providing a communication to an entity 130, in accordance with an embodiment of the present invention. Through user portal 520, process module 510 may present user interface 705 to user 105 at user station 210. Using the user interface 705, the user 105 may input message data 710 and an entity selection 720 for selecting at least one entity to receive the user's 105 communication 750 (operation "1"). Message data 710 may, for example, include data relevant to a present communication, as opposed to user data 732 or 734 which may be re-used in each communication 750 with an entity 130 (e.g., name and address). For instance, in the case of an address change, the message data 710 may include user's 105 new address. Alternatively, in the case of bill payment, message data may include the amount to be paid. Based on the type of communication being performed by process module 510, a template 740 may be retrieved from templates 324 in data storage device 230 (operation "2"). In other cases, template 740 may be retrieved by service module 535 or 530 based on the user data 732 or 734 defining an entity's 130 contact method.

Next, based on the identity of the entity(s) 130 selected by the user 105, service modules 525 and 530 may be triggered to retrieve and process user data 732 and 734 (operation "3"). As shown, service module 525 may retrieve, for example, user data 732 for inclusion in template 740. For instance, user data 732 may specify the method of contact between user 105 and entity 130. As mentioned above, the contact method may, in some instance, be used to select the template 740. In addition, service module 530 may also retrieve user data from entity profile 734, depending on the communication being carried out by process module 510. In accordance with the present invention, both service modules 525 and 530 may retrieve the data by submitting a request to data service module 535 (not shown) which interacts with data repository 425 to retrieve the requested data and to authorize the request based on predefined privileges for the entity 130 stored in, for example, entity profile 730 (not shown).

Based on the message data 710, user data 770 and template 740, process module may create a communication 750 by populating fields of the template 740 with the message data and the retrieved user data (operation "4"). The communication 750 may then be sent to the selected entity station 240 over the appropriate communication channel determined, for example, from user data 732 (operation "5"). In addition, the communication 750 may also be stored in the user's 105 archive data for future reference (operation "6").

Figure 8:
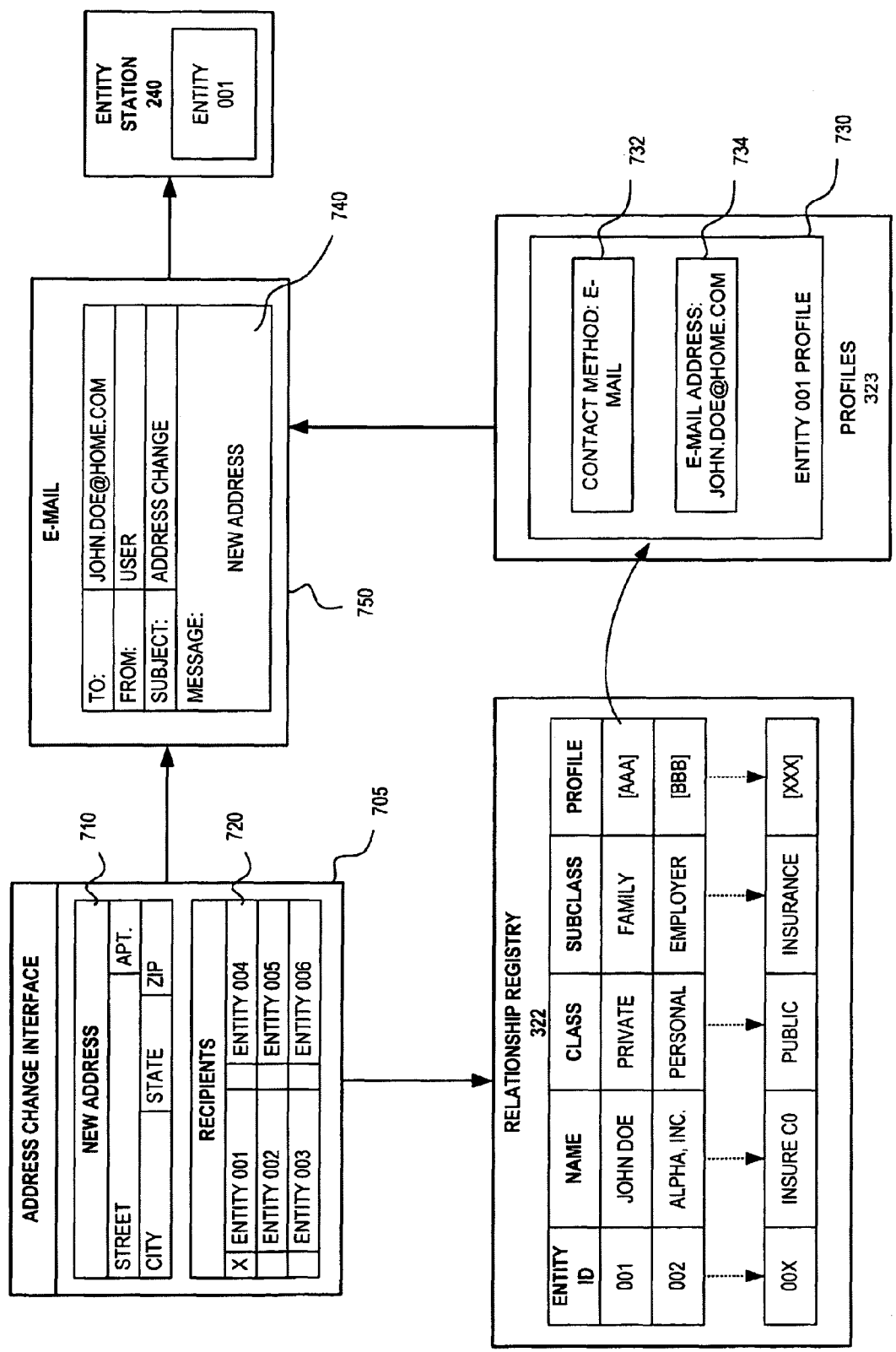
FIG. 8 provides a diagram illustrating exemplary data structures, consistent with an embodiment of the present invention.

FIG. 8 illustrates an block diagram further illustrating an exemplary process for updating a user's 105 address, consistent with the present invention. In this case, a user 105 who has changed his mailing address may, access data management service 312 through user station 210. Initially, data management service 312 may provide a user portal 620 enabling the user 105 to pick from one of several processes 415, including address update process 610. Upon selection, "update address," process 610 may generate a graphical user interface 705 presenting user 105 with an interactive form for inputting address data 620. For instance, as shown in FIG. 8, the address update interface 705 may enable the user 105 to enter the new address information and, in addition, select entities 130 to receive the information. User 105 may select from a listing of entities 001-006, which may be picked individually or from predefined categories, subcategories and/or distribution lists.

Next, process module 610 may trigger service modules 625 and 630 to retrieve user data 732 and 734, based on the identification of each entity 130 selected by the user 105. Services 625 and 630 may, in turn, generate a query based on the requested user data 732 and 734, and submit the query to a data service 635 for retrieval from the corresponding profiles 323 stored in data storage device 320. For instance, as seen in FIG. 8, individual profile 730 of entity 001 included in profiles 323 may be referenced based on the relationship registry 322 stored in data storage device 320 Based on the response returned from data service 635, process module 610 may create an e-mail communication 750 using the retrieved e-mail contact method and the address information provided by the user 105. After the communication 750 is completed, the address update process may optionally present the completed communication 750 created from the template for the user's 105 approve and transmit the communication 750 to the intended entity 130 by the preferred communication method.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer and/or programmer. The various programs or program content can be created using any of the techniques known to one skilled in the art or can be designed in connection with existing software. For example, programs or program content can be designed in or by means of Java, C++, HTML, XML, or HTML with included Java applets or in SAP R/3 or ABAP. One or more of such content can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional computers, personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A method for updating an address of a user, the method being implemented by one or more data processors and comprising:
   accessing, by a user station, a data management service;
   providing, by the data management service, a user portal to enable to the user to select one of a plurality of processes including an address update process;
   receiving, via the user-portal, a user-generated selection of the address update process;
   generating, in response to the user-generated selection, a graphical user interface presenting the user with an interactive form for inputting address data, the graphical user interface comprising an address update interface to enable the user to enter new address information and to select entities to receive the new address information, the user selecting the entities from a list of entities;
   triggering a contact method module service and a contact data module service within the data management service to retrieve user data based on an identification of each entity selected by the user, the contact method module service and the contact data module service generating a query based on the user data to be retrieved and submitting the query to a data service module service from corresponding profiles stored in a data storage device, the data storage device storing a relationship registry referencing profiles of entities;
   generating an e-mail communication using retrieved e-mail contact and address information retrieved via the query, the e-mail communication being generated using a template;
   presenting the user with the generated e-mail communication for approval by the user;
   transmitting the e-mail communication to the selected entities by communication methods specified in the corresponding profiles;
   wherein the relationship registry lists each entity that the user has a relationship with together with metadata describing the relationship and links to an entity profile that includes user data associated with the entity; and
   wherein the entity profiles each contain a plurality of fields so that subsequently received user data is stored in a corresponding field of the entity profile in a data storage device.

2. A method as in claim 1, wherein the graphical user interface is one of a plurality of graphical user interfaces, and such graphical user interfaces are personalized to display information or applications specified for the user.

3. A method as in claim 2, wherein the graphical user interface is one of a plurality of graphical user interfaces, each of the plurality of graphical user interfaces being personalized to display information or applications for one of a plurality of groups of users, and that such graphical user interface is based on a group corresponding to the user.

4. A method as in claim 1, further comprising: assigning, at the provider, privileges to the entity based on the type of relationship between the user and the entity.

5. A method as in claim 4, wherein the user data is retrieved if authorized by privileges assigned to the entity by the user.

6. A method as in claim 5, further comprising: assigning default privileges to the entity based on an assigned relationship class.

7. A method as in claim 6, wherein the privileges include at least one of the following: read, read-only, write, erase, confirmation required, and no confirmation required.

8. A method as in claim 1, wherein the user data is at least one of the following: contact data, calendar data, payment data, accounts data, contract data, public data and archive data.

9. A method as in claim 1, wherein the communications method comprise one or more of: network transfer, electronic mail, short messenger service, multimedia messenger service, instant messenger service, hand-carried mail, facsimile, telegram, broadcast, wireless, and telephone.

10. An article comprising one or more non-transitory machine-readable media storing instructions operable to cause one or more machines to perform operations, the operations comprising:
   accessing, by a user station, a data management service;
   providing, by the data management service, a user portal to enable to the user to select one of a plurality of processes including an address update process;
   receiving, via the user-portal, a user-generated selection of the address update process;
   generating, in response to the user-generated selection, a graphical user interface presenting the user with an interactive form for inputting address data, the graphical user interface comprising an address update interface to enable the user to enter new address information and to select entities to receive the new address information, the user selecting the entities from a list of entities;
   triggering a contact method module service and a contact data module service within the data management service to retrieve user data based on an identification of each entity selected by the user, the contact method module service and the contact data module service generating a query based on the user data to be retrieved and submitting the query to a data service module service from corresponding profiles stored in a data storage device, the data storage device storing a relationship registry referencing profiles of entities;

generating an e-mail communication using retrieved e-mail contact and address information retrieved via the query, the e-mail communication being generated using a template;

presenting the user with the generated e-mail communication for approval by the user;

transmitting the e-mail communication to the selected entities by communication methods specified in the corresponding profiles;

wherein the relationship registry lists each entity that the user has a relationship with together with metadata describing the relationship and links to an entity profile that includes user data associated with the entity; and wherein the entity profiles each contain a plurality of fields so that subsequently received user data is stored in a corresponding field of the entity profile in a data storage device.

11. An article as in claim 10, wherein the graphical user interface is one of a plurality of graphical user interfaces, and such graphical user interfaces are personalized to display information or applications specified for the user or a group of users to which the user is associated.

12. An article as in claim 10, wherein the operations further comprise:

assigning, at the provider, privileges to the entity based on the type of relationship between the user and the entity.

13. An article as in claim 12, wherein the user data is retrieved if authorized by privileges assigned to the entity by the user.

14. An article as in claim 13, wherein the operations further comprise:

assigning default privileges to the entity based on an assigned relationship class.

15. An article as in claim 14, wherein the privileges include at least one of the following: read, read-only, write, erase, confirmation required, and no confirmation required.

16. An article as in claim 10, wherein the user data is at least one of the following: contact data, calendar data, payment data, accounts data, contract data, public data and archive data.; wherein the communications method comprise one or more of: network transfer, electronic mail, short messenger service, multimedia messenger service, instant messenger service, hand-carried mail, facsimile, telegram, broadcast, wireless, and telephone.

17. A method for updating an address of a user, the method being implemented by one or more data processors and comprising:

accessing, by a user station, a data management service;

providing, by the data management service, a user portal to enable to the user to select one of a plurality of processes including an address update process;

receiving, via the user-portal, a user-generated selection of the address update process;

generating, in response to the user-generated selection, a graphical user interface presenting the user with an interactive form for inputting address data, the graphical user interface comprising an address update interface to enable the user to enter new address information and to select entities to receive the new address information, the use selecting the entities from a list of entities;

triggering a contact method module service and a contact data module service within the data management service to retrieve user data based on an identification of each entity selected by the user, the contact method module service and the contact data module service generating a query based on the user data to be retrieved and submitting the query to a data service module service from corresponding profiles stored in a data storage device, the data storage device storing a relationship registry referencing profiles of entities;

generating an e-mail communication using retrieved e-mail contact and address information retrieved via the query, the e-mail communication being generated using a template;

presenting the user with the generated e-mail communication for approval by the user; and transmitting the e-mail communication to the selected entities by communication methods specified in the corresponding profiles;

wherein privileges are assigned to the entity based on the type of relationship between the user and the entity, the types of relationships being stored at the relationship registry and including the following classes: a private class, a personal class, and a public class, the private class representing a private relationship between the entity and the user, the personal class representing a personal relationship that is non-private, and the public class representing a relationship with a public entity, the relationship registry listing each entity that the user has a relationship with together with metadata describing the relationship and links to an entity profile that includes user data associated with the entity, the entity profiles each containing a plurality of fields so that subsequently received user data is stored in a corresponding field of the entity profile in the data storage device.

* * * * *